United States Patent
Margolis et al.

(10) Patent No.: US 12,154,100 B2
(45) Date of Patent: *Nov. 26, 2024

(54) SYSTEMS AND METHODS FOR DISTRIBUTED-LEDGER BASED SETTLEMENT

(71) Applicant: JPMORGAN CHASE BANK, N.A., New York, NY (US)

(72) Inventors: Oliver Margolis, London (GB); Tyrone Lobban, Loughton (GB); Mark Amlin, Weybridge (GB); Marc-Antoine Fichet, London (GB); Andrew Lovell, Bournemouth (GB); Paul Thomas, London (GB); Viresh Mor, Weybridge (GB); John-Paul Antony Crocker, Christchurch (GB); Christine Moy, New York, NY (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/296,337

(22) Filed: Apr. 5, 2023

(65) Prior Publication Data

US 2023/0245100 A1 Aug. 3, 2023

Related U.S. Application Data

(63) Continuation of application No. 16/653,369, filed on Oct. 15, 2019, now Pat. No. 11,669,830.

(51) Int. Cl.
*G06Q 20/36* (2012.01)
(52) U.S. Cl.
CPC .................. *G06Q 20/367* (2013.01)

(58) Field of Classification Search
CPC ...................................................... G06Q 20/367
(Continued)

(56) References Cited

U.S. PATENT DOCUMENTS 11,182,776 B1 * 11/2021 Bhos ....................... G06Q 20/02
2017/0024818 A1 * 1/2017 Wager ................... H04L 9/3234
(Continued)

FOREIGN PATENT DOCUMENTS

KR 102198335 B1 * 1/2021
WO WO-2019043668 A1 * 3/2019 ............. G06F 21/31

OTHER PUBLICATIONS

J. Kongmanee, P. Kijsanayothin and R. Hewett, "Securing Smart Contracts in Blockchain," 2019 34th IEEE/ACM International Conference on Automated Software Engineering Workshop (ASEW), San Diego, CA, USA, 2019, pp. 69-76 . . . (Year: 2019).*

(Continued)

*Primary Examiner* — Virpi H Kanervo
(74) *Attorney, Agent, or Firm* — GREENBERG TRAURIG LLP

(57) ABSTRACT

Systems and methods for distributed ledger-based settlement are disclosed. In one embodiment, a method may include: receiving settlement instructions from a first party providing a commodity and a second party providing cash; matching the settlement instructions; affirming the matched settlement instructions with the parties; a smart contact sending the affirmed settlement instructions to a commodity clearing bank; the smart contract receiving confirmation of a blockage of the commodity from the commodity clearing bank; the smart contact sending the affirmed settlement instructions to a cash clearing bank; the smart contract receiving confirmation of a blockage of the cash from the cash clearing bank; the smart contract executing the exchange of tokens for the commodity for tokens for the (Continued)

cash; and the smart contract writing the tokens for the cash to a wallet for the first party, and writing tokens for the commodity to a wallet for the second party.

20 Claims, 3 Drawing Sheets

(58) Field of Classification Search
USPC .......................................................... 705/41
See application file for complete search history.

(56) References Cited

U.S. PATENT DOCUMENTS

2019/0385157 A1* 12/2019 Mallela ................ G06Q 20/367
2021/0073913 A1*  3/2021 Ingargiola ............. H04L 67/104

OTHER PUBLICATIONS

R. Bhattacharya, M. White and N. Beloff, "A blockchain based peer-to-peer framework for exchanging leftover foreign currency," 2017 Computing Conference, London, UK, 2017, pp. 1431-1435. (Year: 2017).*

* cited by examiner

SYSTEMS AND METHODS FOR DISTRIBUTED-LEDGER BASED SETTLEMENT

The present application is a Continuation of U.S. patent application Ser. No. 16/653,369, now U.S. Pat. No. 11,669,830, filed Oct. 15, 2019, the disclosure of which is hereby incorporated, by reference, in its entirety.

BACKGROUND OF THE INVENTION

1. Field of the Invention

Embodiments relate generally to systems and methods for distributed ledger-based settlement.

2. Description of the Related Art

Precious metals, such as gold, silver, palladium, and platinum, are generally traded in two forms: (1) as "Allocated Gold," wherein the customer has legal title to the metal and requires metal to be physically segregated with detailed record of weight, purity, etc.; and (2) as "Unallocated Gold," where the customer has a general entitlement to the metal but no specific bars are set aside (the holder of the metal is an "unsecured creditor"). Clearing is comprised of two legs; clearing of the precious metal, and clearing of the currency.

Precious metal clearing operates on London time, and currency clearing operates on United States Eastern time, which results in settlement latency between the legs. Moreover, clients tend to bank gold and dollars separately with no linking of legs to one transaction ID. As such, settlement finality is hard to prove and clients use multiple different platforms to reconcile precious metal/currency movements.

SUMMARY OF THE INVENTION

Systems and methods for distributed ledger-based settlement are disclosed. In one embodiment, in an information processing apparatus comprising at least one computer processor, a method for distributed ledger-based settlement may include: (1) receiving settlement instructions from a first party and a second party to a transaction involving a transfer of a commodity for cash, wherein the first party is providing the commodity and the second party is providing the cash; (2) matching the settlement instructions; (3) affirming the matched settlement instructions with the first party and the second party; (4) a smart contact executed by the information processing apparatus sending the affirmed settlement instructions to a commodity clearing bank; (5) the smart contract receiving confirmation of a blockage of the commodity from the commodity clearing bank; (6) the smart contact sending the affirmed settlement instructions to a cash clearing bank; (7) the smart contract receiving confirmation of a blockage of the cash from the cash clearing bank; (8) the smart contract executing the exchange of tokens for the commodity for tokens for the cash; and (9) the smart contract writing the tokens for the cash to a wallet for the first party, and writing tokens for the commodity to a wallet for the second party.

In one embodiment, the commodity clearing bank may tokenize the commodity in response to the receipt of the affirmed settlement instructions.

In one embodiment, the commodity clearing bank may write the tokens for the commodity to a distributed ledger.

In one embodiment, the commodity clearing bank may add the tokens for the commodity to the smart contract.

In one embodiment, the cash clearing bank may tokenize the cash in response to the receipt of the affirmed settlement instructions.

In one embodiment, the cash clearing bank may write the tokens for the cash to a distributed ledger.

In one embodiment, the cash clearing bank may add the tokens for the cash to the smart contract.

In one embodiment, the method may further include redeeming the cash tokens for the first party or redeeming the commodity tokens for the second party.

According to another embodiment, in an information processing apparatus comprising at least one computer processor, a method for distributed ledger-based settlement may include: receiving settlement instructions from a first party and a second party to a transaction involving a transfer of first cash for second cash, wherein the first party is providing the first cash and the second party is providing the second cash; (2) matching the settlement instructions; (3) affirming the matched settlement instructions with the first party and the second party; (4) a smart contact executed by the information processing apparatus sending the affirmed settlement instructions to a first clearing bank; (5) the smart contract receiving confirmation of a blockage of the first cash from the first clearing bank; (6) the smart contact sending the affirmed settlement instructions to a second clearing bank; (7) the smart contract receiving confirmation of a blockage of the second cash from the second clearing bank; (8) the smart contract executing the exchange of tokens for the first cash for tokens for the second cash; and (9) the smart contract writing the tokens for the second cash to a wallet for the first party, and writing tokens for the first to a wallet for the second party.

In one embodiment, the first clearing bank may tokenize the first cash in response to the receipt of the affirmed settlement instructions.

In one embodiment, the first clearing bank may write the tokens for the first cash to a distributed ledger.

In one embodiment, the first clearing bank may add the tokens for the first cash to the smart contract.

In one embodiment, the second clearing bank may tokenize the second cash in response to the receipt of the affirmed settlement instructions.

In one embodiment, the second clearing bank may write the tokens for the second cash to a distributed ledger.

In one embodiment, the second cash clearing bank may add the tokens for the second cash to the smart contract.

In one embodiment, the method may further include redeeming the first cash tokens for the first party or redeeming the second cash tokens for the second party.

According to another embodiment, a system for distributed ledger-based settlement may include a commodity clearing bank, a cash clearing bank, and an exchange server comprising at least one computer processor executing an exchange computer program. The exchange computer program may receive settlement instructions from a first party and a second party to a transaction involving a transfer of a commodity for cash, wherein the first party is providing the commodity and the second party is providing the cash; may match the settlement instructions; may affirm the matched settlement instructions with the first party and the second party, and may execute a smart contact that sends the affirmed settlement instructions to the commodity clearing bank. The commodity clearing bank may block the commodity and confirms blockage to the exchange computer program. The smart contact may send the affirmed settlement instructions to a cash clearing bank. The cash clearing bank may block the cash and confirms blockage to the exchange computer program. The smart contract may execute an exchange of tokens for the commodity for tokens for the cash, and may write the tokens for the cash to a wallet for the first party, and writing tokens for the commodity to a wallet for the second party.

In one embodiment, the commodity clearing bank may tokenize the commodity.

In one embodiment, the cash clearing bank may tokenize the cash.

In one embodiment, the first party may redeem the tokens for the cash with the cash clearing bank, and the second party may redeem the tokens for the commodity with the commodity clearing bank.

BRIEF DESCRIPTION OF THE DRAWINGS

In order to facilitate a fuller understanding of the present invention, reference is now made to the attached drawings. The drawings should not be construed as limiting the present invention but are intended only to illustrate different aspects and embodiments.

DETAILED DESCRIPTION OF PREFERRED EMBODIMENTS

Embodiments are generally directed to systems and methods for distributed ledger-based commodity settlement.

In embodiments, the system may connect directly to a trading client's back office systems and facilitate the atomic exchange of cash for commodities (e.g., precious metals such as gold, silver, platinum, palladium, etc., base metals (e.g., copper, lead, zinc, tin, nickel, aluminum, cobalt, etc.), etc. using a straight-through processing (STP) basis. Settlement information may be pulled from both the buyer and the seller and may be matched on the platform. Successful matches create a Delivery versus Payment ("DVP") smart contract that causes the creation of precious metal tokens and cash tokens, which may be subject to off-platform credit and sanctions checks. The tokens may be exchanged using, for example, a distributed ledger and may be redeemed. Balances may then be updated independent of the distributed ledger.

It should be recognized that although embodiments may be described in the context of DVP processing, it should be recognized that embodiments may facilitate Payment versus Payment (PVP) processing as well. For example, two cash clearing banks may be involved instead of a commodity clearing bank and a cash clearing bank.

Figure 1:
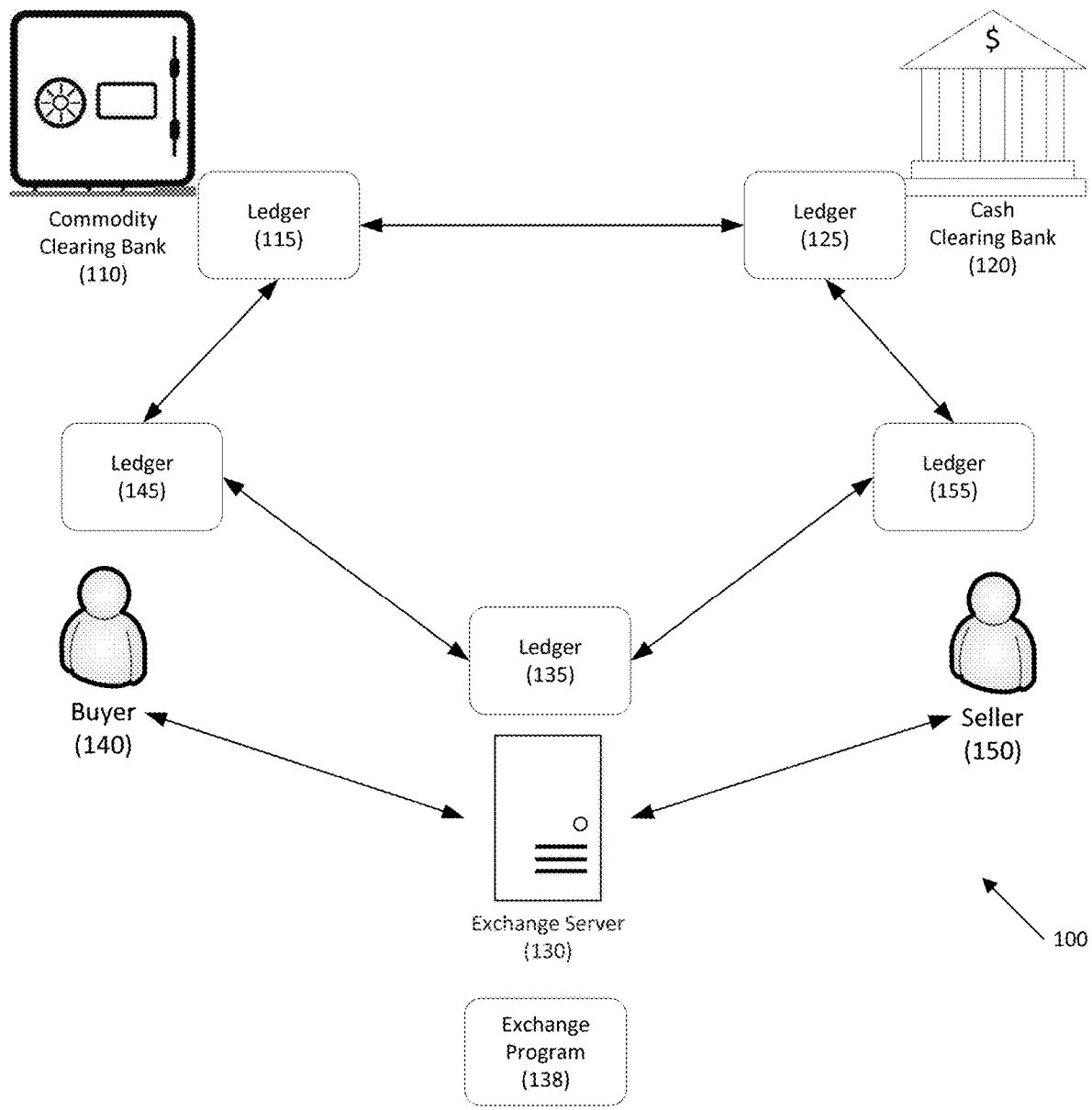
FIG. 1 depicts a system for distributed ledger-based settlement according to one embodiment.

FIG. 1 illustrates a system for a distributed ledger based commodity settlement system according to an exemplary embodiment of the invention. As shown in FIG. 1, system 100 may include commodity clearing bank 110, cash clearing bank 120, and exchange server 130. It should be recognized that although only commodity clearing bank 110 and cash clearing bank 120 are illustrated, a greater number of commodity clearing banks 110 and cash clearing banks 120 may be provided as is necessary and/or desired.

Commodity clearing bank 110 may be any entity that maintains or controls a commodity (e.g., physical bullion, base metals, etc.). As noted above, for PVP processing, commodity clearing bank 110 may be a second cash clearing bank.

Cash clearing bank 120 may be any suitable financial institution that holds cash for its clients. In one embodiment, cash clearing bank 120 may be a bank, a FinTech, the client, etc.

Exchange server 130 may be a server that may execute an exchange program 138 for communicating with commodity clearing bank 110 and cash clearing bank 120. Exchange program 138 may facilitate both DVP transactions and PVP transactions.

In one embodiment, the communication may be direct between exchange program 138 and commodity clearing bank 110, and between exchange program 138 and cash clearing bank 120, or be achieved by writing to respective ledgers 115, 125, and 135, or by any suitable manner.

Ledgers 135 may include any suitable immutable, cryptographically-verifiable distributed ledger system, such as Blockchain-based distributed ledgers, where trust is not provided by a central authority or trusted intermediary, but is instead established by the dissemination of identical copies of the same ledger with cryptographic proof of its correctness to each of the nodes.

Ledgers 135 may be part of a public, private, permissioned, or consortium-type distributed ledger system. In one embodiment, each ledger may be associated with, or may execute, one or more smart contract that may be executed in response to an event, such as a writing to the respective ledger 135.

In one embodiment, each ledger 115, 125, 135, 145, and 155 may maintain a public state that may be accessed by all network participants, and a private state that may accessed only by participant for the associated node.

System 100 may further include buyer 140 and seller 150, the counterparties to the transaction. In one embodiment, buyer 140 and/or seller 150 may be represented by an agent, such as a broker, financial institution, etc. (not shown). Buyer 140 and/or seller 150 may participate using one or more electronic devices (not shown) and may participate as nodes in the distributed ledger via ledgers 145 and 155, respectively.

Figure 2:
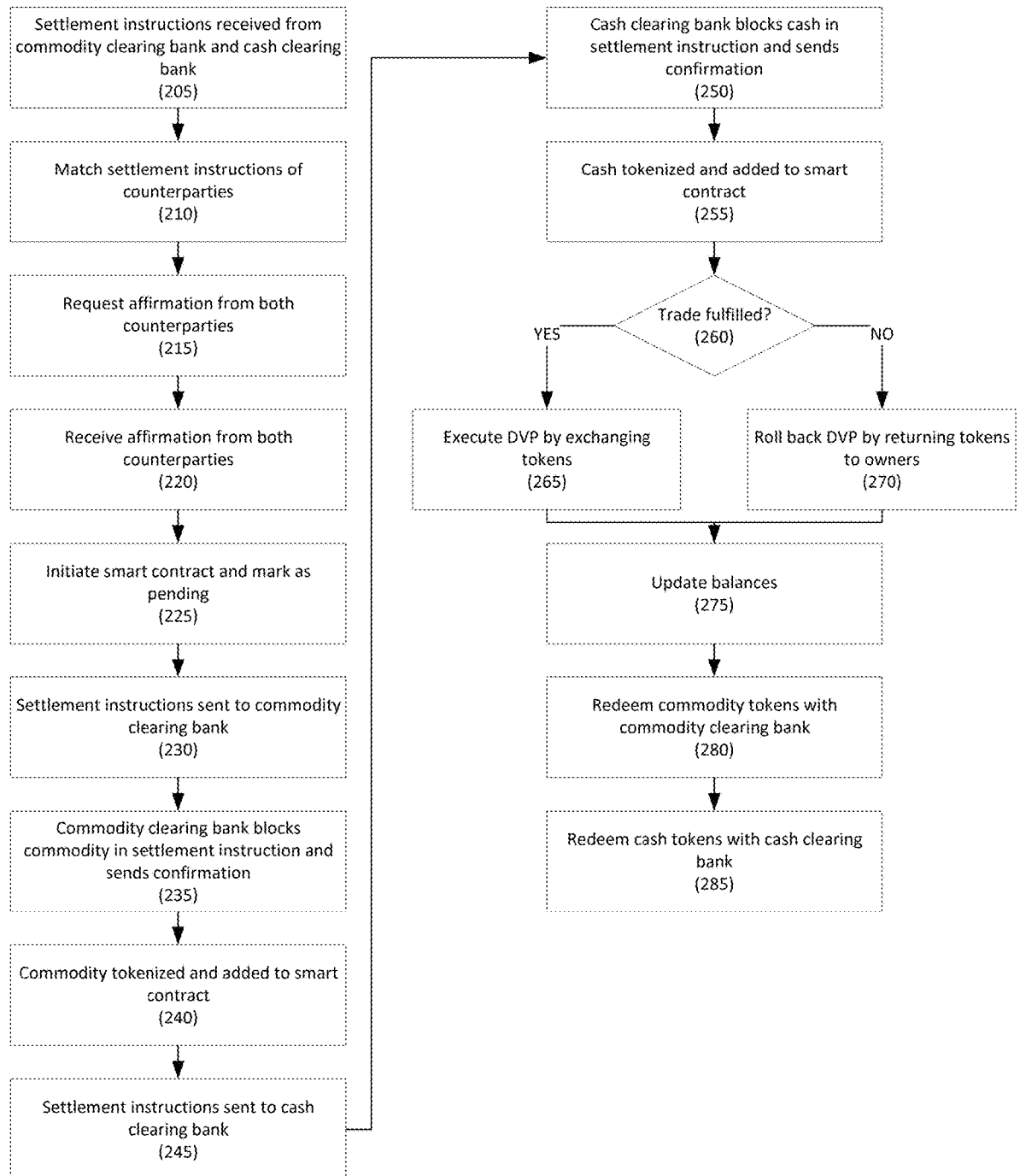
FIG. 2 depicts a method for distributed ledger-based DVP commodity settlement according to one embodiment.

Referring now to FIG. 2, an exemplary method for a distributed ledger backed stock transaction system according to an exemplary embodiment of the invention. In step 205, a portal may receive settlement instructions from counterparties to a trade (e.g., a buyer and a seller) for a DVP transaction (e.g., commodity in exchange for cash). In one embodiment, the settlement instructions may be received directly from the counterparties; in another embodiment, the settlement instructions may be written by the counterparties to a distributed ledger.

In one embodiment, both counterparties may send the same version of the settlement instructions, i.e., the same set of both commodity and cash instructions on a net or gross basis.

In one embodiment, the settlement instructions may be received as a file, and each file may contain both the commodity and the cash settlement instructions. Each file may contain settlement instruction belonging to only one value date, and each settlement instruction file upload may have instructions belonging to a single counterparty In one embodiment, each counterparty may create multiple settlement instructions with one or more counterparty and may submit the settlement instructions in batch.

In one embodiment, the commodity and the cash settlement instructions may be grouped by reference identifier that is provided by each client's back office system. The set of settlement instructions having the same reference identifier may be treated as one group for matching, affirmation and settlement.

In step 210, the settlement instructions from each counterparty may be matched. In one embodiment, an exchange program may receive settlement instructions from both parties, and, upon receipt, may initiate matching of the settlement instructions. In one embodiment, a matching key may be used to facilitate matching. In one embodiment, the matching key may include one or more field in the settlement instructions that must match (e.g., quantity, price, etc.).

In step 215, the exchange program may request affirmation of the settlement instructions from each of the counterparties and, in step 220, the affirmation from the counterparties may be received. In one embodiment, if one of the counterparties rejects an affirmation, the group of instructions may be marked as rejected or similar and the settlement of the instructions will be suspended.

Once both counterparties affirm the matched settlement instructions, all the instructions may be marked as affirmed or similar and the instructions will move further for settlement.

In one embodiment, the requests and/or affirmations may be written to the distributed ledger.

In step 225, a smart contract for settlement may be initiated. In one embodiment, the smart contract initiation may trigger the settlement process and checks by both the commodity clearing bank and the cash clearing bank.

In step 230, the smart contract may send the affirmed settlement instructions to the commodity clearing bank. For example, the smart contract may request the commodity clearing bank to perform balance and other checks.

In one embodiment, an API may be used to send the settlement instructions to the commodity clearing bank.

In step 235, the commodity clearing bank may block commodity per the settlement instructions and may send a confirmation of such to the exchange program. For example, the commodity clearing bank may block the commodity in the seller's account for settlement, and may confirm such to the exchange program. In one embodiment, the confirmation may be written to the distributed ledger, or it may be otherwise communicated to, or written to, the smart contract.

In step 240, the commodity may be tokenized and added to the smart contract. For example, commodity tokens may be created and issued to the seller's account, such as an electronic wallet, and may then be moved to the smart contract. In one embodiment, the tokenization may be written to the distributed ledger, or it may be otherwise communicated to, or written to, the smart contract.

In step 245, the smart contract may send the affirmed settlement instructions to the cash clearing bank. For example, the smart contract may request the cash clearing bank to perform balance and other checks.

In one embodiment, an API may be used to send the settlement instructions to the cash clearing bank.

In step 250, the cash clearing bank may block cash per the settlement instructions and may send a confirmation of such to the exchange program. For example, the cash clearing bank may block the cash in the buyer's account for settlement, and may confirm such to the exchange program. In one embodiment, the confirmation may be written to the distributed ledger, or it may be otherwise communicated to, or written to, the smart contract.

In step 255, the cash may be tokenized and added to the smart contract. For example, commodity tokens may be created and issued to the buyer's account, such as an electronic wallet, and may then be moved to the smart contract. In one embodiment, the tokenization may be written to the distributed ledger, or it may be otherwise communicated to, or written to, the smart contract.

It should be noted that the smart contract's activities with the commodity clearing bank and the cash clearing bank may be performed in any order, substantially simultaneously, etc.

In step 260, based on the settlement date/time, the exchange program may check to see if the DVP exchange can be performed. If it can, in step 265, the DVP exchange is performed based on the settlement time/date, and the cash and commodity tokens are exchanged.

In one embodiment, the electronic wallet on the distributed ledger for each party may be updated to reflect the exchange. The transaction may also be written to the distributed ledger.

If the DVP exchange cannot be performed (e.g., the contract has expired, one of the counterparties does not have sufficient assets, etc.), in step 270, the DVP exchange is rolled back, and the tokens are returned to the respective buyer and seller.

In one embodiment, the electronic wallet on the distributed ledger for each party may be updated to reflect the return of tokens, and the unsuccessful transaction may also be written to the distributed ledger.

In step 275, the wallets may be updated based on either the successful execution of the DVP exchange, or the return of tokens.

In step 280, the buyer may redeem the commodity tokens with the commodity clearing bank for the commodity. The redemption may be written to the distributed ledger.

In step 285, the seller may redeem the cash tokens with the cash clearing bank for the cash. The redemption may be written to the distributed ledger.

In one embodiment, the redemption may be performed in any order, substantially simultaneously, etc.

Figure 3:
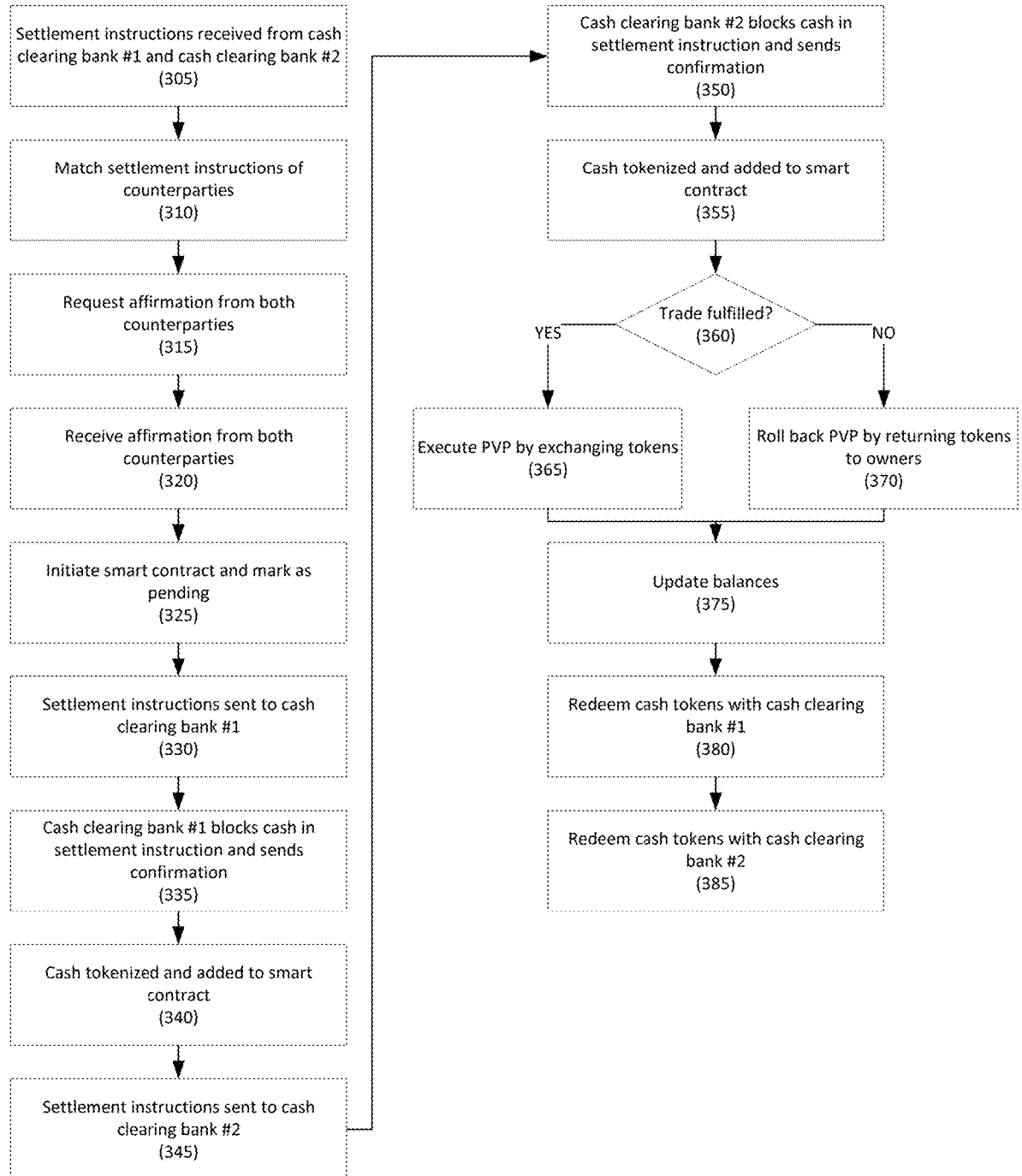
FIG. 3 depicts a method for distributed ledger-based PVP cash settlement according to one embodiment.

Referring now to FIG. 3, an exemplary method for a distributed ledger backed stock transaction system according to an exemplary embodiment of the invention. In step 305, a portal may receive settlement instructions from counterparties to a trade (e.g., a buyer and a seller) for a PVP transaction (e.g., cash in exchange for cash). In one embodiment, the settlement instructions may be received directly from the counterparties; in another embodiment, the settlement instructions may be written by the counterparties to a distributed ledger.

In one embodiment, both counterparties may send the same version of the settlement instructions, i.e., the same set of both cash instructions on a net or gross basis.

In one embodiment, the settlement instructions may be received as a file, and each file may contain both sets of cash settlement instructions. Each file may contain settlement instruction belonging to only one value date, and each settlement instruction file upload may have instructions belonging to a single counterparty In one embodiment, each counterparty may create multiple settlement instructions with one or more counterparty and may submit the settlement instructions in batch.

In one embodiment, the cash settlement instructions may be grouped by reference identifier that is provided by each client's back office system. The set of settlement instructions having the same reference identifier may be treated as one group for matching, affirmation and settlement.

In step 310, the settlement instructions from each counterparty may be matched. In one embodiment, an exchange program may receive settlement instructions from both parties, and, upon receipt, may initiate matching of the settlement instructions. In one embodiment, a matching key may be used to facilitate matching, similar to that in step 210, above.

In step 315, the exchange program may request affirmation of the settlement instructions from each of the counterparties and, in step 320, the affirmation from the counterparties may be received. These steps may be similar to steps 215 and 220, above.

In step 325, a smart contract for settlement may be initiated. In one embodiment, the smart contract initiation may trigger the settlement process and checks by both cash clearing banks.

In step 330, the smart contract may send the affirmed settlement instructions to the first cash clearing bank. For example, the smart contract may request the first cash clearing bank to perform balance and other checks.

In one embodiment, an API may be used to send the settlement instructions to the first cash clearing bank.

In step 335, the first cash clearing bank may block the cash per the settlement instructions and may send a confirmation of such to the exchange program. For example, the first cash clearing bank may block the cash in the seller's account for settlement, and may confirm such to the exchange program. In one embodiment, the confirmation may be written to the distributed ledger, or it may be otherwise communicated to, or written to, the smart contract.

In step 340, the cash may be tokenized and added to the smart contract. For example, commodity tokens may be created and issued to the seller's account, such as an electronic wallet, and may then be moved to the smart contract. In one embodiment, the tokenization may be written to the distributed ledger, or it may be otherwise communicated to, or written to, the smart contract.

In step 345, the smart contract may send the affirmed settlement instructions to the second cash clearing bank. For example, the smart contract may request the second cash clearing bank to perform balance and other checks.

In one embodiment, an API may be used to send the settlement instructions to the cash clearing bank.

In step 350, the second cash clearing bank may block cash per the settlement instructions and may send a confirmation of such to the exchange program. For example, the second cash clearing bank may block the cash in the buyer's account for settlement, and may confirm such to the exchange program. In one embodiment, the confirmation may be written to the distributed ledger, or it may be otherwise communicated to, or written to, the smart contract.

In step 355, the cash may be tokenized and added to the smart contract. For example, commodity tokens may be created and issued to the buyer's account, such as an electronic wallet, and may then be moved to the smart contract. In one embodiment, the tokenization may be written to the distributed ledger, or it may be otherwise communicated to, or written to, the smart contract.

It should be noted that the smart contract's activities with the cash clearing banks may be performed in any order, substantially simultaneously, etc.

In step 360, based on the settlement date/time, the exchange program may check to see if the PVP exchange can be performed. If it can, in step 365, the PVP exchange is performed based on the settlement time/date, and the cash tokens are exchanged.

In one embodiment, the electronic wallet on the distributed ledger for each party may be updated to reflect the exchange. The transaction may also be written to the distributed ledger.

If the PVP exchange cannot be performed (e.g., the contract has expired, one of the counterparties does not have sufficient assets, etc.), in step 370, the DVP exchange is rolled back, and the tokens are returned to the respective buyer and seller.

In one embodiment, the electronic wallet on the distributed ledger for each party may be updated to reflect the return of tokens, and the unsuccessful transaction may also be written to the distributed ledger.

In step 375, the wallets may be updated based on either the successful execution of the PVP exchange, or the return of tokens.

In step 380, the buyer may redeem the cash tokens with the first cash clearing bank. The redemption may be written to the distributed ledger.

In step 385, the seller may redeem the cash tokens with the second cash clearing bank for the cash. The redemption may be written to the distributed ledger.

In one embodiment, the redemption may be performed in any order, substantially simultaneously, etc.

It should be recognized that although several embodiments have been disclosed, these embodiments are not exclusive to each other, and features or elements from one embodiment may be used with another.

The disclosures of U.S. patent application Ser. No. 16/558,415, filed Sep. 3, 2019, U.S. patent application Ser. No. 15/869,421, filed Jan. 12, 2018, U.S. Provisional Patent Application Ser. No. 62/725,331, filed Aug. 31, 2018, and U.S. Provisional Patent Application Ser. No. 62/446,185, filed Jan. 13, 2017 are hereby incorporated, by reference, in their entireties.

Hereinafter, general aspects of implementation of the systems and methods of the invention will be described.

The system of the invention or portions of the system of the invention may be in the form of a "processing machine," such as a general-purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general-purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system. Thus, embodiments of the invention may include a processing machine running the iOS operating system, the OS X operating system, the Android operating system, the Microsoft Windows™ operating systems, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instruction or single programming language be utilized in conjunction with the operation of the system and method of the invention. Rather, any number of different programming languages may be utilized as is necessary and/or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method for a distributed ledger-based settlement comprising:
    executing, by an information processing apparatus comprising at least one exchange computer processor coupled with an exchange computer memory, an exchange computer program stored in the exchange computer memory and causing the execution of the following:
    receiving a first settlement instruction from a first party to a transaction involving a transfer of first cash for second cash, wherein the first party is providing the first cash;
    receiving a second settlement instruction from a second party to the transaction, wherein the second party is providing the second cash;
    retrieving a matching key that specifies one or more fields in the first settlement instruction and the second settlement instruction that must match, wherein the one or more fields comprises a quantity and a price;
    matching the first settlement instruction and the second settlement instruction using the one or more fields specified by the matching key;
    affirming the matched settlement instructions with the first party and the second party;
    executing a smart contract, comprising:
    sending the affirmed matched settlement instructions to a first clearing bank, wherein the first clearing bank checks that the first cash in the affirmed matched settlement instructions is available;
    receiving a confirmation of a blockage of the first cash from the first clearing bank;
    sending the affirmed matched settlement instructions to a second clearing bank, wherein the second clearing bank checks that the second cash in the affirmed matched settlement instructions is available;
    receiving a confirmation of a blockage of the second cash from the second clearing bank;
    confirming that the affirmed settlement instructions have not expired;
    executing an exchange of tokens for the first cash for tokens for the second cash; and
    writing the tokens for the second cash to a wallet for the first party and writing the tokens for the first cash to a wallet for the second party, wherein:
        the wallet for the first party and the wallet for the second party are maintained on a blockchain-based system;
        the tokens for the first cash and the tokens for the second cash are generated by the blockchain-based system in which a consensus algorithm operating on a plurality of distributed computer nodes updates a distributed ledger in which multiple copies of the distributed ledger exist across the plurality of distributed computer nodes;
        the tokens for the first cash and the tokens for the second cash are added to a block in the blockchain-based system according to the consensus algorithm, and
        writing the tokens for the first cash to the wallet for the first party and writing the tokens for the second cash to the wallet for the second party comprises adding a new block to the blockchain-based system.

2. The method of claim 1, wherein the first clearing bank tokenizes the first cash in response to receiving the affirmed settlement instructions.

3. The method of claim 2, wherein the first clearing bank writes the tokens for the first cash to the blockchain-based system.

4. The method of claim 2, wherein the first clearing bank adds the tokens for the first cash to the smart contract.

5. The method of claim 1, wherein the second clearing bank tokenizes the second cash in response to receiving the affirmed settlement instructions.

6. The method of claim 5, wherein the second clearing bank writes the tokens for the second cash to the blockchain-based system.

7. The method of claim 5, wherein the second cash clearing bank adds the tokens for the second cash to the smart contract.

8. The method of claim 1, further comprising:
redeeming the tokens for the first cash for the first party or redeeming the tokens for the second cash for the second party.

9. A system for distributed ledger based settlement, comprising:
a first clearing bank;
a second clearing bank; and
an exchange server comprising at least one exchange computer processor coupled with an exchange computer memory storing executing an exchange computer program, wherein:
the exchange computer program receives a first settlement instruction from a first party to a transaction involving a transfer of first cash for second cash, wherein the first party is providing the first cash;
the exchange computer program receives a second settlement instruction from a second party to the transaction, wherein the second party is providing the second cash;
the exchange computer program retrieves a matching key that specifies one or more fields in the first settlement instruction and the second settlement instruction that must match, wherein the one or more fields comprises a quantity and a price;
the exchange computer program matches the first settlement instruction and the second settlement instruction using the one or more fields specified by the matching key;
the exchange computer program affirms the matched settlement instructions with the first party and the second party;
the exchange computer program executes a smart contract sending the affirmed matched settlement instructions to a first clearing bank;
the first clearing bank checks that the first cash in the affirmed matched settlement instructions is available;
the first clearing bank blocks the first cash and confirms a blockage to the exchange computer program;
the exchange computer program executes the smart contract sending the affirmed matched settlement instructions to the second clearing bank;
the second clearing bank checks that the second cash in the affirmed matched settlement instructions is available;
the second clearing bank blocks the second cash and confirms a blockage to the exchange computer program;
the exchange computer program executes the smart contract confirming that the affirmed settlement instructions have not expired;
the exchange computer program executes an exchange of tokens for the first cash for tokens for the second cash; and
the exchange computer program executes the smart contract writing the tokens for the second cash to a wallet for the first party and writing the tokens for the first cash to a wallet for the second party, wherein:
the wallet for the first party and the wallet for the second party are maintained on a blockchain-based system;
the tokens for the first cash and the tokens for the second cash are generated by the blockchain-based system in which a consensus algorithm operating on a plurality of distributed computer nodes updates a distributed ledger in which multiple copies of the distributed ledger exist across the plurality of distributed computer nodes;
the tokens for the first cash and the tokens for the second cash are added to a block in the blockchain-based system according to the consensus algorithm; and
writing the tokens for the first cash to the wallet for the first party and writing the tokens for the second cash to the wallet for the second party comprises adding a new block to the blockchain-based system.

10. The system of claim 9, wherein the first clearing bank tokenizes the first cash in response to receiving the affirmed settlement instructions.

11. The system of claim 10, wherein the first clearing bank writes the tokens for the first cash to the blockchain-based system.

12. The system of claim 10, wherein the first clearing bank adds the tokens for the first cash to the smart contract.

13. The system of claim 9, wherein the second clearing bank tokenizes the second cash in response to receiving the affirmed settlement instructions.

14. The system of claim 13, wherein the second clearing bank writes the tokens for the second cash to the blockchain-based system.

15. The system of claim 13, wherein the second cash clearing bank adds the tokens for the second cash to the smart contract.

16. The system of claim 9, wherein the exchange computer program redeems the tokens for the first cash for the first party or redeems the tokens for the second cash for the second party.

17. A non-transitory computer readable storage medium, including instructions stored thereon, which when read and executed by one or more computer processors, cause the one or more computer processors to perform steps comprising:
receiving a first settlement instruction from a first party to a transaction involving a transfer of first cash for second cash, wherein the first party is providing the first cash;
receiving a second settlement instruction from a second party to the transaction, wherein the second party is providing the second cash;
retrieving a matching key that specifies one or more fields in the first settlement instruction and the second settlement instruction that must match, wherein the one or more fields comprises a quantity and a price;
matching the first settlement instruction and the second settlement instruction using the one or more fields specified by the matching key;
affirming the matched settlement instructions with the first party and the second party;
sending the affirmed matched settlement instructions to a first clearing bank, wherein the first clearing bank checks that the first cash in the affirmed matched settlement instructions is available;

receiving a confirmation of a blockage of the first cash from the first clearing bank;

sending the affirmed matched settlement instructions to a second clearing bank, wherein the second clearing bank checks that the second cash in the affirmed matched settlement instructions is available;

receiving a confirmation of a blockage of the second cash from the second clearing bank;

confirming that the affirmed settlement instructions have not expired;

executing an exchange of tokens for the first cash for tokens for the second cash; and writing the tokens for the second cash to a wallet for the first party and writing the tokens for the first cash to a wallet for the second party, wherein:

the wallet for the first party and the wallet for the second party are maintained on a blockchain-based system;

the tokens for the first cash and the tokens for the second cash are generated by the blockchain-based system in which a consensus algorithm operating on a plurality of distributed computer nodes updates a distributed ledger in which multiple copies of the distributed ledger exist across the plurality of distributed computer nodes;

the tokens for the first cash and the tokens for the second cash are added to a block in the blockchain-based system according to the consensus algorithm; and writing the tokens for the first cash to the wallet for the first party and writing the tokens for the second cash to the wallet for the second party comprises adding a new block to the blockchain-based system.

18. The non-transitory computer readable storage medium of claim 17, wherein the first clearing bank tokenizes the first cash in response to receiving the affirmed settlement instructions and writes the tokens for the first cash to the blockchain-based system or adds the tokens for the first cash to a smart contract.

19. The non-transitory computer readable storage medium of claim 17, wherein the second clearing bank tokenizes the second cash in response to receiving the affirmed settlement instructions and writes the tokens for the second cash to the blockchain-based system or adds the tokens for the second cash to a smart contract.

20. The non-transitory computer readable storage medium of claim 17, further including instructions stored thereon, which when read and executed by one or more computer processors, cause the one or more computer processors to perform steps comprising:

redeeming the tokens for the first cash for the first party or redeeming the tokens for the second cash for the second party.

\* \* \* \* \*